United States Patent
Louboutin

(10) Patent No.: US 9,866,904 B1
(45) Date of Patent: Jan. 9, 2018

(54) INTERACTION RECOGNITION OF A TELEVISION CONTENT INTERACTION DEVICE

(71) Applicant: Roku, Inc., Los Gatos, CA (US)

(72) Inventor: Sylvain René Yves Louboutin, Sunnyvale, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 15/348,592

(22) Filed: Nov. 10, 2016

(51) Int. Cl.
*H04N 21/482* (2011.01)
*H04N 21/442* (2011.01)
*H04N 21/422* (2011.01)
*H04N 21/4223* (2011.01)
*H04N 21/8547* (2011.01)
*G06F 17/30* (2006.01)

(52) U.S. Cl.
CPC . *H04N 21/44222* (2013.01); *G06F 17/30743* (2013.01); *H04N 21/4223* (2013.01); *H04N 21/42203* (2013.01); *H04N 21/42204* (2013.01); *H04N 21/8547* (2013.01)

(58) Field of Classification Search
CPC .................................................. H04N 21/482
See application file for complete search history.

(56) References Cited

U.S. PATENT DOCUMENTS 8,484,677 B1 * 7/2013 Eldering ................ G06Q 30/02
725/20
2009/0235312 A1 * 9/2009 Morad ............... G06Q 30/0241
725/44

* cited by examiner

*Primary Examiner* — Hunter B Lonsberry
(74) *Attorney, Agent, or Firm* — Sterne, Kessler, Goldstein & Fox P.L.L.C.

(57) ABSTRACT

Interaction recognition of a television content interaction device is discussed herein. An embodiment operates by receiving, by at least one processor, interaction data from a receiver, wherein the receiver is configured to receive interaction data; determining, by at least one processor, an interaction from the interaction data; storing, by at least one processor, the determined interaction; selecting, by at least one processor, a content modification based upon the determined interaction; and modifying, by at least one processor, content streamed to the receiver according to the selected content modification.

19 Claims, 9 Drawing Sheets

INTERACTION RECOGNITION OF A TELEVISION CONTENT INTERACTION DEVICE

BACKGROUND

With a rise in technology surrounding the control of broadcast content, new types of interactions may be used to control the broadcast content. With the introduction of these new interactions, new challenges arise. Such challenges include how the interactions are collected, how the interactions interact with a content server, and how to control broadcast content based on these interactions. Today, interaction devices allow for controlling broadcast content at a receiver end. These types of interaction devices may control broadcast content at the receiver according to information sent by the interaction device and received by the receiver.

However, these types of interaction devices and receivers do not allow for the storage of the interactions with the interaction device. Further, the interactions to control broadcast content may only be set at a local level, meaning interactions may control broadcast content differently depending on the interaction device and receiver. Thus, these types of interaction devices and receivers do not allow for control of broadcast content at a server level.

SUMMARY

Provided herein are system, apparatus, article of manufacture, method and/or computer program product embodiments, and/or combinations and sub-combinations thereof, for interaction recognition of a television interaction device.

An embodiment includes a method. The method may include receiving, by at least one processor, interaction data from a receiver, wherein the receiver is configured to receive interaction data. The method may further comprise determining, by at least one processor, an interaction from the interaction data and storing, by at least one processor, the determined interaction. Additionally, the method may also include selecting, by at least one processor, a content modification based upon the determined interaction; and modifying, by at least one processor, content streamed to the receiver according to the selected content modification Another embodiment includes a system that may include a memory located and at least one processor located coupled to the memory. The at least one processor may be configured to receive interaction data from a receiver, wherein the receiver is configured to receive interaction data from a plurality of sensors. Further, the at least one processor may further be configured to determine an interaction from the interaction data, store the determined interaction, select a content modification based upon the determined interaction; and modify content streamed to the receiver according to the selected content modification.

A further embodiment includes a tangible, non-transitory computer-readable device having instructions stored thereon that, when executed by at least one computing device, causes the at least one computing device to perform operations. These operations may include receiving interaction data from a receiver, wherein the receiver is configured to receive interaction data, determining an interaction from the interaction data, storing the determined interaction, selecting a content modification based upon the determined interaction; and modifying content streamed to the receiver according to the selected content modification.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, method and/or computer program product embodiments, and/or combinations and sub-combinations thereof, for sensory detection of interactions during broadcast content.

Figure 1:
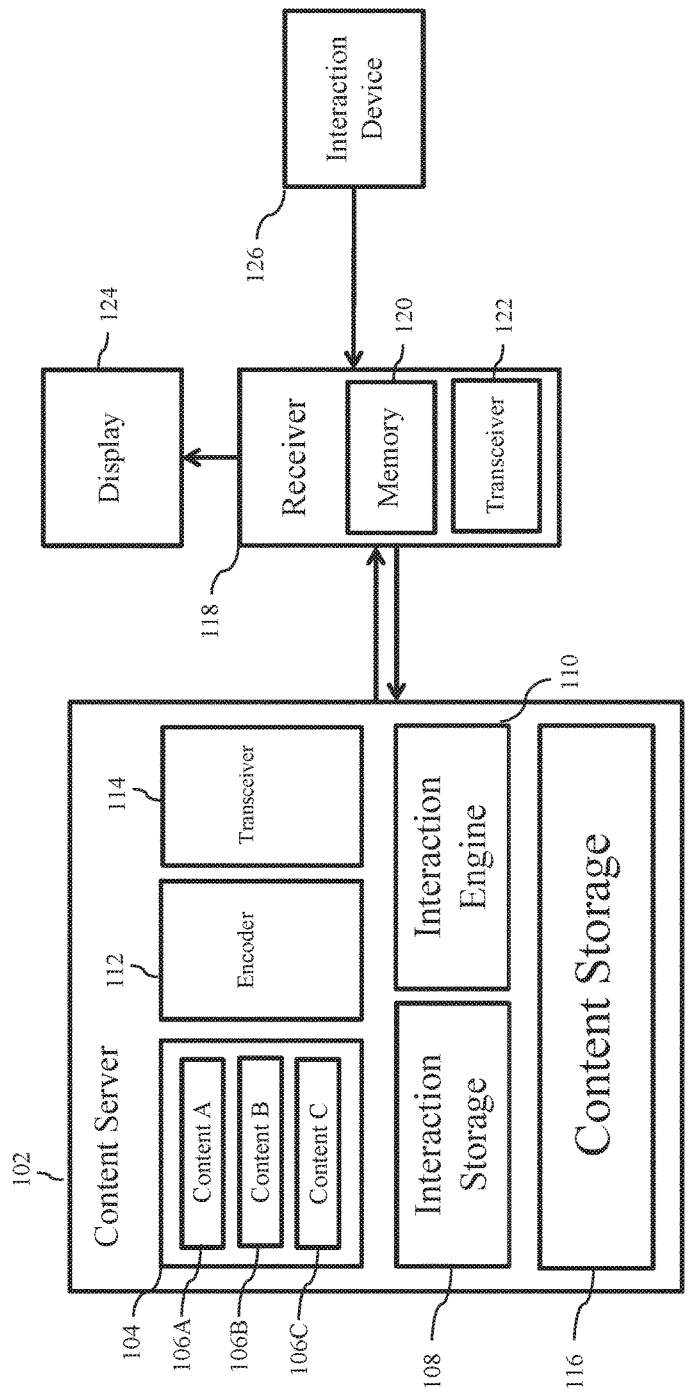
FIG. 1 is a block diagram of a system for sensory detection of interactions during broadcast content, according to some embodiments.

FIG. 1 is a block diagram of a system for sensory detection of interactions during broadcast content, according to some embodiments. According to an embodiment, a system for sensory detections may comprise content server 102, receiver 118, display 124, and interaction device 126. In an embodiment, content server 102 may comprise a plurality of content 106 (comprising content A 106A, content B 106B, and content C 106C), interaction storage 108, interaction engine 110, encoder 112, transceiver 114, and memory 116.

According to an embodiment, content server 102 may broadcast plurality of content 106. In an embodiment, plurality of content 106 may comprise image sources, audio sources, television programs, movies, music, pictures, advertisements, streamable content, internet television, live content, or any combination thereof—to name a few examples. According to an embodiment, plurality of content 106 may be stored in content storage 116. Content storage 116 may comprise random access memory (RAM), read-only memory (ROM), electronically erasable programmable random access memory (EEPROM), hard disk drive (HDD), solid state drive (SSD), or any combination thereof—to name a few examples.

In an embodiment, content server may broadcast plurality of content 106 via transceiver 114. For example, content server 102 may broadcast content A 106A via transceiver 114. According to an embodiment, transceiver 114 may broadcast plurality of content 106 as analog television signals, digital television signals, satellite television signals, analog radio signals, digital radio signals, satellite radio signals, internet video streaming (including dial-up, broadband, fiber, DSL, wireless, mobile network, and satellite internet), internet radio streaming, or any combination thereof—to name a few examples.

According to an embodiment, content server 102 may encode and compress content via encoder 112 before it is broadcast. For example, encoder 112 may encode content 106A before it is broadcast by transceiver 114. In an embodiment, encoder 112 may encode plurality of content 106 by a plurality of encoding and codec systems, such as NTSC, PAL, SECAM, FM, AM, DAB+, DMB, DTMB, ATSC, ISDB, DVB-S, DVB-S2, DVB-C, DVB-T, DTT, MMDS, MVDS, Flash, MPEG-1, MPEG-4, WMV, VP6, RealVideo, Real Audio, FLAC, ALAC, AMR, EVRC, are any combination thereof—to name a few examples.

In an embodiment, plurality of content 106 broadcast via transceiver 114 may be received by receiver 118. Receiver 118 may comprise a radio, cable box, a television antenna, a television, a smart phone, a tablet, a streaming device, a gaming console, or any combination thereof—to name a few examples. According to an embodiment, receiver 118 may comprise transceiver 122 that may receive plurality of content 106 broadcast by transceiver 114.

According to an embodiment, receiver 118 may display plurality of content 106 received from transceiver 114 on display 124. Display 124 may comprise a television, a monitor, a phone screen, a tablet screen, a projector, or any combination thereof—to name a few examples. For example, content 106A may comprise a television program. Receiver 118 may receive content 106A from transceiver 114 and the television program on display 124.

In an embodiment, interaction device 126 may comprise a device to send signals to receiver 116 to manipulate the content displayed on display 124. For example, interaction device 126 may send signals to receiver 116 to control the speed, volume, channel, scene, screen, color, playback, or any combination thereof of the content displayed on display 124—to name a few examples. As a few non-limiting examples, interaction device 126 may comprise a remote control, a smart phone touchscreen, a tablet touchscreen, or any combination thereof. According to an embodiment, interaction device 126 may send signals to receiver 118 via infrared communications, fiber communications, wired communications, WiFi, wireless communications, electromagnetic communications, or any combination thereof—to name a few examples.

According to another embodiment, interaction device 126 may comprise a plurality of sensors that detect interactions with interaction device 126. The plurality of sensors that detect interactions with interaction device 126 may comprise interactive buttons, a microphone, a camera, an angle sensor, a motion sensor, or any combination thereof—to name a few examples. As a non-limiting example, interaction device 126 may comprise a remote control that detects interactions with buttons of the remote control and the angle of the remote control.

In another embodiment, interaction device 126 may comprise a plurality of sensors that monitor the environment and area surrounding interaction device 126. The plurality of sensors that monitor the environment and area surrounding interaction device 126 may comprise a proximity sensor, a light sensor, a camera, a microphone, a proximity sensor, a heat sensor, a motion detector, or any combination thereof—to name a few examples. As a non-limiting example, interaction device 126 may comprise a camera that detects objects in front of interaction device 126.

According to an embodiment, interaction device 126 may send sensor data from its sensors to receiver 118. Interaction device 126 may send data from its sensors from its sensors to receiver 118 via infrared communications, fiber communications, wired communications, WiFi, wireless communications, electromagnetic communications, or any combination thereof—to name a few examples. For example, interaction 126 may comprise a camera and may send data from its camera to receiver 118.

In an embodiment, receiver 118 may store sensor data from interaction device's 126 sensors in memory 120. Memory 120 may comprise RAM, ROM, EEPROM, HDD, SSD, or any combination thereof—to name a few examples. For example, receiver 118 may receive camera sensor data from interaction device 126. Once the data is received, receiver 118 may store the sensor data in memory 120.

According to an embodiment, receiver 118 may send sensor data received from interaction device 126 to content server 102. Receiver 118 may send the data via transceiver 122 to content server 102. Transceiver 122 may transmit the sensor data to content server 102 via fiber communications, wired communications, WiFi, mobile network communications, wireless communications, or any combination thereof—to name a few.

In an embodiment, receiver 118 may send information regarding the content displayed on displayed on display 124. The information regarding the content displayed may comprise the speed, volume, color, resolution, hue, or any combination thereof—to name a few examples—of the content displayed on display 124.

In an embodiment, content server 102 may store received sensor data from receiver 118 in interaction storage 108. Interaction storage 108 may comprise RAM, ROM, EEPROM, HDD, SSD, or any combination thereof—to name a few examples. According to an embodiment, content server 102 may classify sensor data received from receiver 118. The sensor data may be classified by type, timestamp, set thresholds, a grading system, type of interaction device, type of receiver, or any combination thereof—to name a few examples. According to an embodiment, content server 102 may store received information regarding the content displayed in interaction storage 108.

Figure 2:
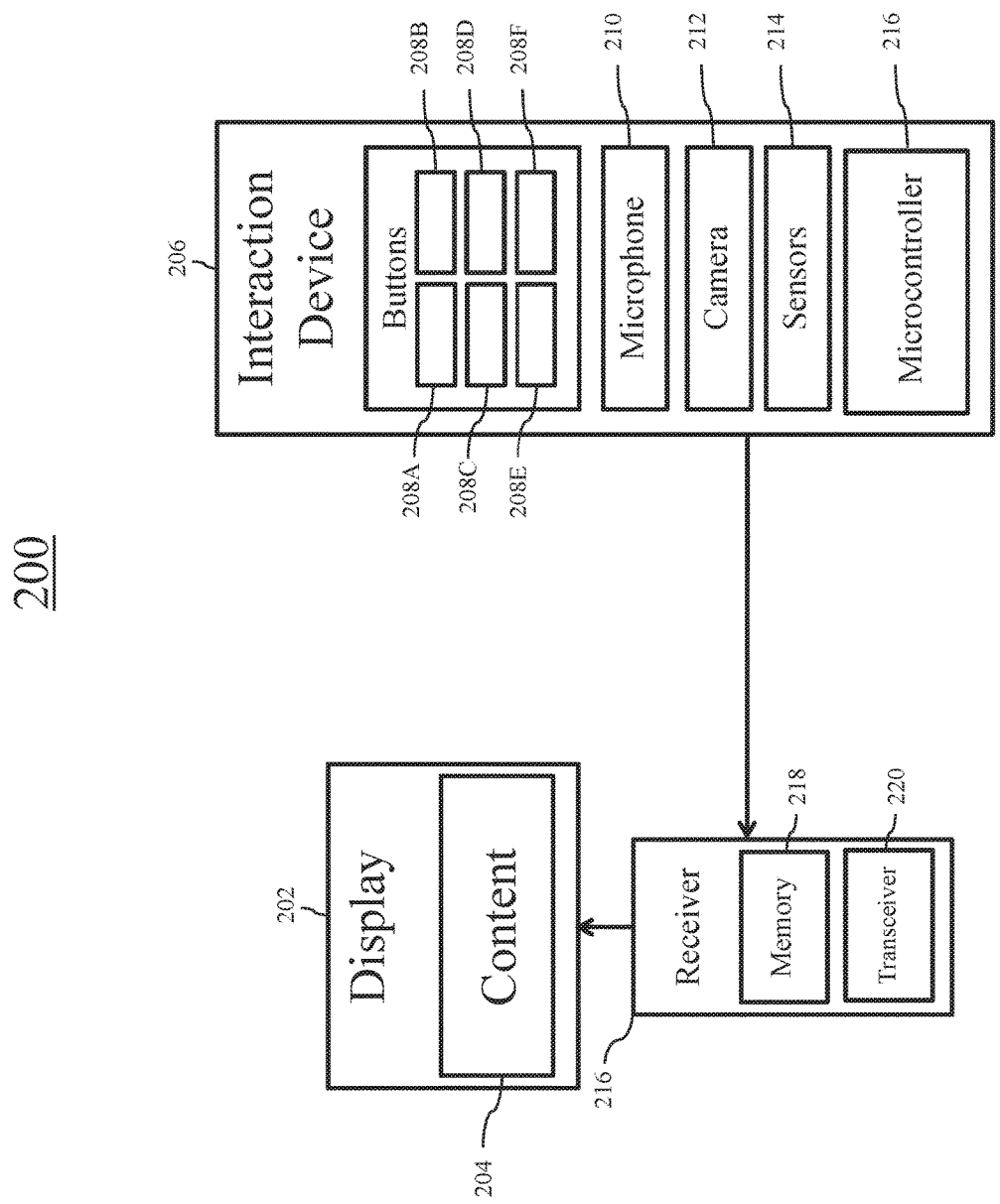
FIG. 2 is a block diagram of interaction device system 200, according to some embodiments.

FIG. 2 is a block diagram of interaction device system 200, according to some embodiments. According to an embodiment, interaction device system 200 may comprise display 202, receiver 216, and interaction device 206. In an embodiment, receiver 216 may display received content 204 on display 202 as discussed in FIG. 1.

In an embodiment, interaction device 206 may comprise a plurality of buttons 208 (comprising button A 208A, button B 208B, button C 208C, button D 208D, button E 208E, and button F 208F), microphone 210, camera 212, plurality of interaction and environmental sensors 214, and microcontroller 216.

According to an embodiment, buttons 208 may comprise interactive buttons. Interactive buttons may comprise push buttons, pressure sensitive buttons, physical buttons, virtual buttons, capacitive buttons, resistive buttons, or any combination thereof—to name a few examples. In an embodiment, buttons 208 may receive interaction inputs as interactions with buttons 208. These interactions may comprise button presses, button taps, button holds, button touches, button swipes, or any combination thereof—to name a few examples. The received interaction input may comprise the type of interaction. For example, button A may receive a hold interaction, button b may receive a tap interaction, and button C may receive a tap interaction.

In an embodiment, each button of buttons 208 may perform a function to manipulate content 204 displayed on display 202. These functions may comprise pause, skip, fast forward, rewind, skip back, stop, volume up, volume down, play, mute, channel up, channel down, or any combination thereof—to name a few examples. For example, button A 208A may pause content 204 when interacted with, button B 208B may play content 204 when interacted with, button C 208C may lower the volume of content 204 when interacted with, and button D 208D may raise the volume of content 204 when interacted with.

According to an embodiment, each button of buttons 208 may perform a function to navigate a user interface displayed on display 202. These functions may comprise selecting text, selecting an image, selecting a menu, enter, scroll up, scroll down, scroll left, scroll right, or any combination thereof—to name a few examples. In an embodiment, the user interface may comprise a navigating the user interface may comprise selecting a movie scene, a song, a feature, a menu, start time for streamed content, or any combination thereof—to name a few.

In an embodiment, microphone 210 may comprise a plurality of microphone types. The plurality of microphone types may comprise a front microphone, a rear microphone, electret microphones, dynamic microphones, condenser microphones, directional microphones, bidirectional microphones, omnidirectional microphones, unidirectional microphones, or any combination thereof—to name a few examples. According to an embodiment, microphone 210 may detect the ambient noise around interaction device 206. Ambient noise may comprise, for example, background noise, voices, music, or any combination thereof—to name a few examples. For example, microphone 210 may detect any voices around interaction device 206.

According to an embodiment, camera 212 may comprise a plurality of camera types. The plurality of camera types may comprise forward-facing cameras, a rear-facing cameras, digital cameras, infrared cameras, CMOS cameras, CCD cameras, wireless cameras, or any combination thereof—to name a few examples. In an embodiment, camera 212 may detect whether an object is in view of camera 212. The object detected may be a person, an obstacle (such as a furniture, doors, walls, ceilings, floors, or any combination thereof—to name some examples), display 202, or any combination thereof—to name a few examples.

In an embodiment, camera 212 may detect an object through background subtraction, Gaussian subtraction, frame differencing, mean filter, or any combination—to name a few.

According to an embodiment, camera 212 may detect the movement of detected objects. Camera 212 may detect the movement of detected object by frame comparisons, trajectory estimations, vector analysis, or any combination thereof—to name a few examples. As a non-limiting example, camera 212 may detect a user's hand in front of camera 212. Camera 212 may further detect that the user's hand is oscillating between two positions, such as, for example, in a "waving" gesture.

In an embodiment, sensors 214 may comprise interaction and detection sensors that detect information as detailed in FIG. 1. For example, sensors 214 may comprise an angle sensor that detects the angle of interaction device 206 from the ground.

According to an embodiment interaction data from buttons 208, microphone 210, camera 212, and plurality of interaction and environmental sensors 214 may be sent to microcontroller 216. Microcontroller 216 may comprise a processor, a CPU, a microprocessor, an FPGA, a PIC, an AVR, or any combination thereof—to name a few examples.

In an embodiment, when microcontroller 216 receives interaction data, a timestamp is created and associated with the data. The timestamp may comprise the time, date, content streamed, duration, or any combination thereof—to name a few examples. For example, microcontroller 216 may receive interaction data comprising a button press from buttons 208. Microcontroller 216 may then create a timestamp comprising the time the button press was received, and associate that timestamp with the button press.

Figure 3:
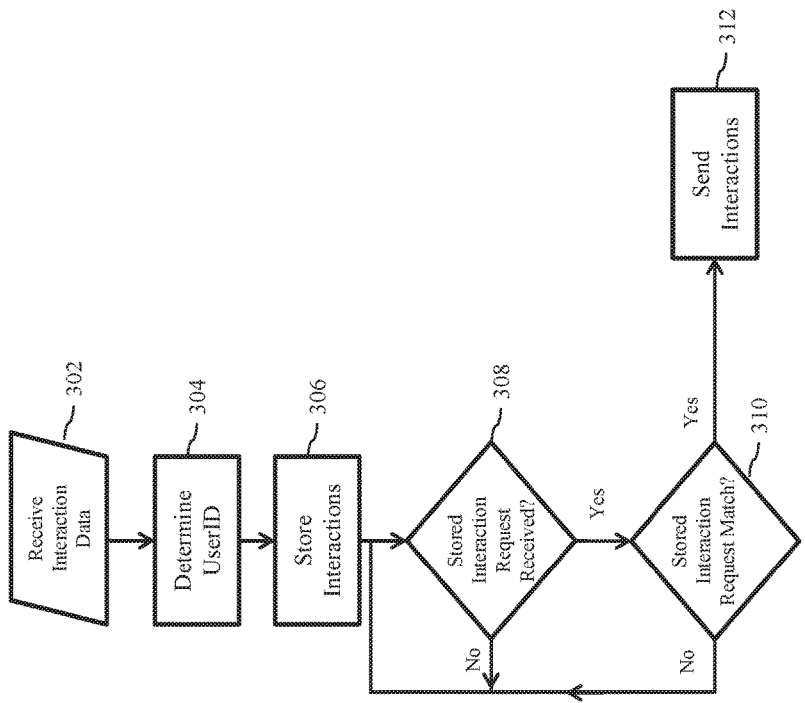
FIG. 3 is a flowchart illustrating a process for storing received interactions, according to some embodiments.

FIG. 3 is a flowchart illustrating a process for storing received interactions, according to some embodiments.

According to an embodiment, at 302, content server 102 may receive interaction data and associated timestamps from receiver 118. Interaction data may comprise interaction with buttons, data from a camera, data from a microphone, data from environmental sensor, data from interaction sensors, data from any other sensor, or any combination thereof. Interaction data and associated timestamps may be sent from interaction device 126 to receiver 118 as detailed in the discussion of FIG. 2.

In an embodiment, at 304, content server 102 may receive userID information from receiver 118. UserID information may comprise a serial number, location, IP address, MAC address, registration data, or any combination thereof—to name a few examples—of receiver 118.

According to an embodiment, at 306, interaction engine 110 may assign interaction data and associated timestamps received from receiver 118 with the userID information of receiver 118 and store the interaction data, associated timestamps, and userID information in interaction storage 108. Associating the data together may comprise storing the data in the same table, storing the data in the same column, creating a pointer, or any combination thereof—to name a few examples. For example, receiver 118 may receive interaction data comprising a number of button interactions from interaction device 126 along with an associated timestamp. Receiver 118 may send the interaction data and timestamp to content server 102 along with userID information comprising the IP address of receiver 118. Interaction engine 110 may store the IP address of receiver 118 and the interaction data in the same table within interaction storage 108.

According to an embodiment, at 308, interaction 110 may determine whether or not content server 102 has received a stored interaction request. The stored interaction request may comprise a request for particular interaction data, particular userID information, timestamps, or any combination thereof—to name a few examples. In an embodiment, the stored interaction request may be received by content server 102 as a query, keyboard strokes, mouse clicks, mouse drags, or any combination thereof—to name a few examples. If content server 102 has received a stored interaction request, then 310 is performed, otherwise 308 is repeated.

In an embodiment, at 310, interaction engine 110 determines whether if the stored interaction request matches any of the interaction data stored in interaction storage 108. For example, content server 102 may receive a stored interaction request comprising data requesting interaction data associated with a specific timestamp. Interaction engine 110 may then determine whether any interaction data associated with the specific timestamp is stored in interaction storage 108. If there is no data stored in interaction storage 108, interaction engine 110 may repeat 308, otherwise interaction engine 110 may perform 312.

According to an embodiment, at 312, interaction 110 may return a result. The result may comprise the data stored in interaction storage 108 that matches the stored interaction request.

Figure 4:
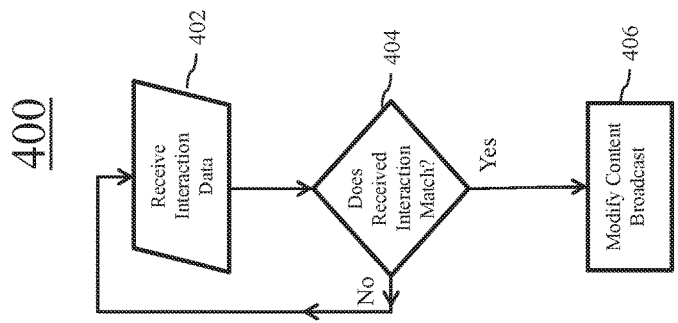
FIG. 4 is a flowchart illustrating a process for modifying broadcast content based upon received interactions, according to some embodiments.

FIG. 4 is a flowchart illustrating a process for modifying broadcast content based upon received interactions, according to some embodiments.

At 402, content server 102 may receive interaction data and associated timestamps as well as information regarding the content displayed on display 124 from receiver 118. Interaction data may comprise interaction with buttons, data from a camera, data from a microphone, data from environmental sensor, data from interaction sensors, or any combination thereof. Interaction data and associated timestamps may be sent from interaction device 126 to receiver 118 as detailed in the discussion of FIG. 2.

At 404, interaction engine 110 may determine if the received interaction data matches any interaction data from a stored list of modifying interactions. The stored list of modifying interactions may comprise tables, columns, lists, vectors, rows, or any combination thereof—to name a few examples—of interactions associated with content 106 being broadcast by content server 102. For example, the stored list of modifications may comprise button interactions, button interaction rhythms, button functions, user interface navigations, songs, music, gestures, facial expressions, background objects, environmental sensor data, interaction sensor data, background data, or any combination thereof—to name a few examples—associated with content 106 being broadcast. Interaction engine 110 may determine that received interaction data matches a modifying interaction from the stored list of modifying interactions, in which case the system moves on to 406, otherwise 402 is repeated. For example, content server 102 may receive interaction data comprising an interaction with a button to perform the volume down function while content A 106A is being broadcast. Interaction engine 110 may then compare the received interaction data to the stored list of modifying interactions associated with content A 106A, which may comprise an interaction with a button to perform the volume down function. When interaction engine 110 matches the received interaction data to the stored list of modifying interactions associated with content A 106A, the system may perform 406.

According to an embodiment, content server 102 may receive interaction data that comprises button interactions and timestamps. For example, content server 102 may receive interaction data comprising button A 208A pressed at timestamp A, button B 208B pressed at timestamp B, button A 208A pressed at timestamp C, and button D 208D pressed at timestamp D. In an embodiment, interaction engine 110 may determine a rhythm the buttons were interacted with through use of the associated timestamps. Interaction 110 may further match the determined rhythm to a rhythm from the stored list of modifying interactions.

According to an embodiment, content server 102 may receive interaction data that comprises timestamps and button interactions comprising user interface navigations. For example, content server 102 may receive interaction data comprising an interaction with button A 208A, comprising selecting a scene, at timestamp A, an interaction with button B 208B comprising starting a scene, at timestamp B, and an interaction with button A 208, comprising selecting the scene, at timestamp C. In an embodiment, interaction engine 110 may determine a history of scene selection through use of the associated timestamps. Interaction engine 110 may further match the determined history of scene selection to a history of scene selections from the stored list of modifying interactions.

In an embodiment, content server 102 may receive interaction data that comprises ambient noise received by microphone 210 and a timestamp. For example, content server 102 may receive interaction data comprising ambient noise received by microphone 210 at timestamp A. According to an embodiment, interaction engine 110 may determine whether the ambient noise matches a specific song or piece of music. Interaction engine 110 may make this determination by comparing the ambient noise to a music database, using a music recognition software, sending the ambient noise to a music recognition engine, comparing the ambient noise to stored sound files, or any combination thereof—to name a few examples. In an embodiment, interaction engine 110 may further match the determined song or music from the ambient noise to a song or piece of music from the stored list of modifying interactions.

According to another embodiment, interaction engine 110 may determine whether the ambient noise matches a specific voice line or phrase. Interaction engine 110 may make this determination by comparing the ambient noise to data from a database, sending the ambient noise to a speech recognition engine, using a speech recognition software, using a speech-to-text software, or any combination thereof—to name a few examples. In an embodiment, interaction engine 110 may further match the determined voice line or phrase to a voice line or phrase from the stored list of modifying interactions.

According to an embodiment, content server 102 may receive interaction data that comprises an image or video received from camera 212 and a timestamp. For example, content server 102 may receive interaction data comprising an image from camera 212. In an embodiment, interaction engine 110 may determine whether the object in an image comprises a face. Interaction engine 110 may make this determination through the use of background filtering, facial recognition software, a facial recognition engine, principal component analysis, linear discriminate analysis, elastic bunch graph matching, or any combination thereof—to name a few examples. In an embodiment, interaction engine 110 may further match the presence of a face in the image to the requirement of a face in front of an interaction device from the stored list of modifying interactions.

In another embodiment, interaction engine 110 may determine facial expressions of a face present in a received image or video from camera 212. Interaction engine 110 may make this determination through the use of background filtering, facial recognition software, a facial recognition engine, principal component analysis, linear discriminate analysis, elastic bunch graph matching, or any combination thereof— to name a few examples. In an embodiment, interaction engine 110 may further match the determined facial expression from the received image or video to facial expressions from the stored list of modifying interactions.

According to an embodiment, content server 102 may receive interaction data that comprises an orientation of the interaction device and a timestamp. For example, content server 102 may receive interaction data comprising a first angle the interaction device is oriented at timestamp A, a second angle at timestamp B, and a third angle at timestamp C. In an embodiment, interaction engine 110 may determine a gesture being made with the interaction device through the angles and associated timestamps. For example, based on the timing of the timestamps and the change in the angles, interaction engine 110 may determine that a waving gesture is being made with the interaction device. Interaction 110 may further match the determined gesture to a gesture from the stored list of modifying interactions.

At 406, interaction engine 110 may modify the content streamed by content sever 102 based upon which interaction from the stored list of modifying interactions was matched. Modifying the content may comprise rewinding the content, speeding up the content, changing the resolution of the content, changing the volume of the content, stopping the content, pausing the content, playing the content, skipping to another portion of the content, selecting new content to play, or any combination thereof—to name a few examples. In an embodiment, each interaction from the stored list of modifying interactions may comprise an associated content modification.

For example, content server 102 may receive interaction data that comprises button interactions and timestamps. From these button interactions and timestamps, interaction engine 110 may determine a rhythm that matches a rhythm from the stored list of modifying interactions. The matched rhythm from the stored list of modifying interactions may be associated with a content modification comprising stopping the content.

In an embodiment, modifying the content may comprise broadcasting new content. For example, content server 102 may be broadcasting content A 106A to receiver 118 when content server 102 receives interaction data comprising ambient noise received by microphone 210. Interaction engine 110 may then match the received ambient noise to a song from the stored list of modifying interactions. Further, the song from the stored list of modifying interactions may be associated with broadcasting new content. Based on this match, interaction engine 110 may end the broadcast of content A 106A to receiver 118, and begin broadcasting content B 106B to receiver 118.

Figure 5:
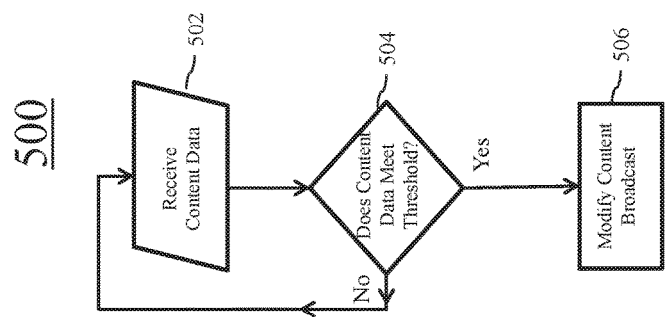
FIG. 5 is a flowchart illustrating a process for modifying broadcast content based upon received content data, according to some embodiments.

FIG. 5 is a flowchart illustrating a process for modifying broadcast content based upon received content data, according to some embodiments.

At 502, content server 102 may receive content data regarding the content displayed on display 126 from receiver 118. The content data may comprise the speed, volume, color, resolution, hue, or any combination thereof—to name a few examples—of the content displayed on display 124. Content server 102 may receive the content data from receiver 118 as detailed in the discussion of FIG. 2.

At 504, interaction engine 110 may compare the received content data to thresholds from a stored list of content thresholds. The stored list of content thresholds may comprise upper and lower threshold value regarding volume, resolution, color, hue, or any combination thereof—to name a few examples. If values from the content data are greater than the respective upper threshold or lower than the respective lower threshold, then the system moves on to 506. Otherwise, 502 is repeated.

As a non-limiting example, content server 102 may receive content data comprising the volume, speed, and resolution of content displayed on display 124. Interaction engine 110 may then compare the volume, speed, and resolution of the content displayed to the upper and lower thresholds for volume, speed, and resolution from the stored list of content thresholds. Interaction engine 110 may then determine that the volume of the content displayed falls below the lower threshold for volume from the stored list of content thresholds.

At 506, interaction engine 110 may modify the content streamed by content sever 102 based upon which threshold from the stored list of content thresholds was exceeded. Modifying the content may comprise rewinding the content, speeding up the content, changing the resolution of the content, changing the volume of the content, stopping the content, pausing the content, playing the content, or any combination thereof—to name a few examples. In an embodiment, each threshold from the stored list of content thresholds may comprise an associated content modification.

For example, content server 102 may receive content data that comprises a volume. Interaction engine 110 may then that the received volume falls below the lower threshold for volume from the stored list of content thresholds. The lower threshold for volume from the stored list content thresholds may be associated with a content modification comprising pausing the content.

Figure 6:
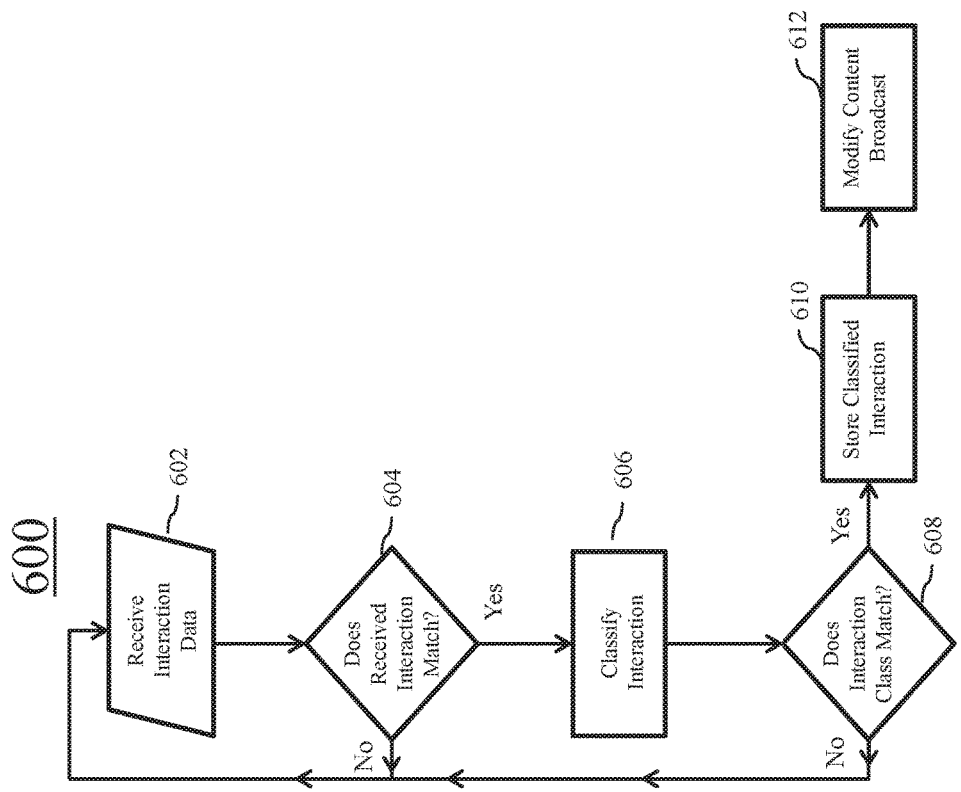
FIG. 6 is a flowchart illustrating a process for detecting an interaction class, according to some embodiments.

FIG. 6 is a flowchart illustrating a process for detecting an interaction class, according to some embodiments.

At 602, content server 102 may receive interaction data and associated timestamps as well as information regarding the content displayed on display 124 from receiver 118. Interaction data may comprise interaction with buttons, data from a camera, data from a microphone, data from environmental sensor, data from interaction sensors, or any combination thereof. Interaction data and associated timestamps may be sent from interaction device 126 to receiver 118 as detailed in the discussion of FIG. 2.

At 604, interaction engine 110 may match the received interaction data to the stored list of modifying interactions as detailed in FIG. 4. If the received interaction data matches interactions from the list of modifying interactions then the system moves to 606, otherwise 602 is repeated. At 606, interaction engine 110 may classify the received interaction data. Classifying the received interaction data may comprise assigning the interaction data a type, assigning a grade to the interaction, sorting the interaction into content played, or any combination thereof—to name a few examples.

In an embodiment, interaction engine 110 may assign the received interaction data a type. The type may comprise a button interaction, a song, an object in an image, a gesture, a phrase, a functionality of a button, or any combination thereof—to name a few examples. For example, the received interaction data may comprise a plurality of button interactions. Interaction engine 110 may then assign the type "button interactions" to the received interaction data.

According to an embodiment, a grade may be assigned to the received interaction data based on the matched interaction from the stored list of modifying interactions. In an embodiment, each interaction from the stored list of modifiable may comprise a grade. The grade may be based on the frequency the interaction is received by content server 102, the type of interaction, the complexity of the interaction, or any combination thereof—to name a few examples.

In an embodiment, the received interaction data may be assigned a class based on the content being broadcast while the interaction was received. For example, the received interaction data may be received while content A 106A is being broadcast and comprise a plurality of button interactions. Interaction engine 110 may then assign the a class to the plurality of button interactions based on the data being received while content A 106A was being broadcast.

At 608, interaction engine 110 determines if the class assigned to the received interaction data matches a class from the stored list of modifying classes. The stored list of modifying classes may comprise types, grades, content groups, or any combination thereof, with each comprising a respective content modification. The respective content modification may comprise rewinding, speeding up, changing the resolution, changing the volume stopping, pausing, playing, or any combination thereof—to name a few examples—of the content streamed. If the assigned class matches a class from the stored list of modifying classes then the system moves to 610, otherwise 602 is repeated.

At 610, the received interaction data and its assigned class is stored in interaction storage 108. At 612, the content streamed by content server 102 is modified according to the respective content modification of the assigned class. For example, content server 102 may receive interaction data that is assigned a class. This class may comprise a content modification of stopping the content. Interaction engine 110 may then stop the content being broadcast by content server 102.

Figure 7A:
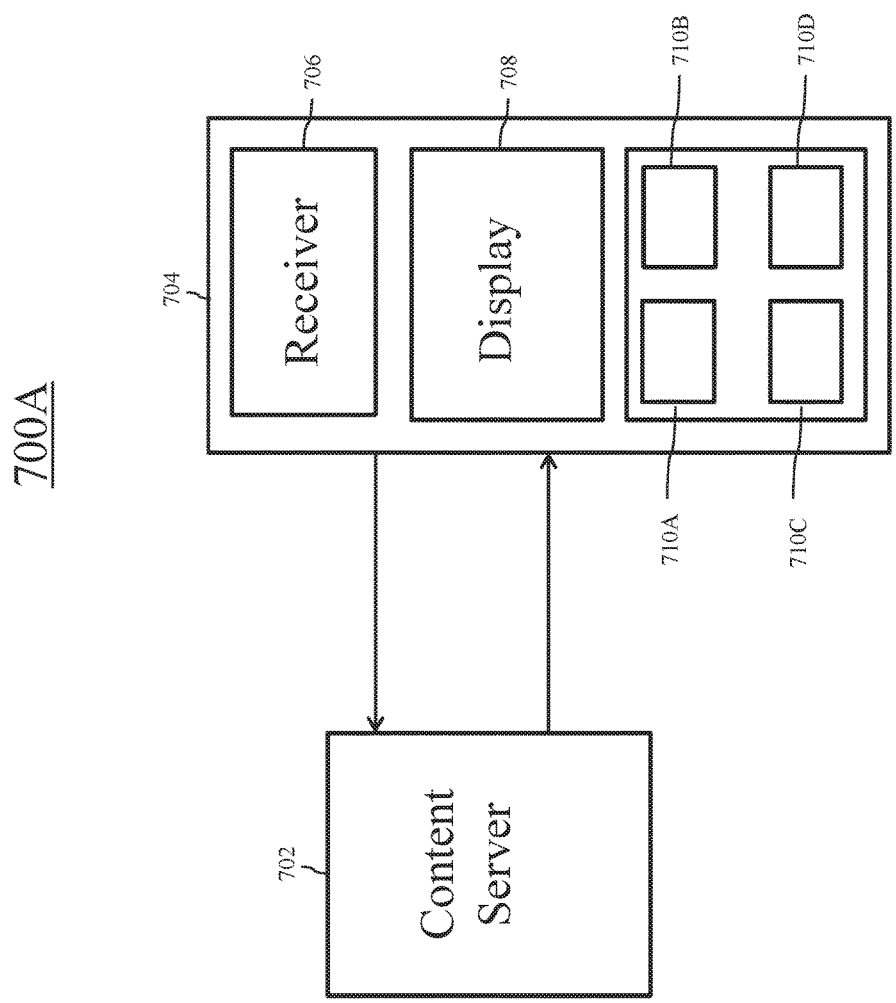
FIG. 7A is an exemplary case study of an interaction recognition of a television content interaction device, according to an embodiment.

FIG. 7A is an exemplary case study of an interaction recognition of a television content interaction device, according to an embodiment.

According to an embodiment, content server 702 may comprise a content server such as, for example, content server 102, and may stream content to interaction device 704 over the internet. The content streamed to interaction device 704 may comprise a video, a television show, a movie, an advertisement, a song, a live stream, an audio file, or any combination thereof—to name a few examples. In an embodiment, interaction device 704 may comprise a smart phone comprising receiver 706, display 708, and a plurality of buttons 710 (comprising button 710A, button 710B, button 710C, and button 710D.)

In an embodiment, receiver 706 may comprise, for example, receiver 118 and display 708 may comprise, for example, display 124. According to an embodiment, buttons 710 may comprise interactive buttons, resistive buttons, capacitive buttons, physical buttons, virtual buttons, or any combination thereof—to name a few examples.

According to an embodiment, the content streamed to interaction device 704 may comprise a prompt for a button rhythm. The button rhythm may comprise a desired order and timing in which buttons 710 are to be pressed. For example, the content streamed to interaction device 704 may comprise a prompt to press button 710B, two seconds later to press button 710A, and one second later to press button 710C. In an embodiment, a user may interact with buttons 710 according to the button prompt. For example, a user may press button 710B, two seconds later press button 710A, and one second later press button 710C. According to an embodiment, when each of these buttons are pressed by the user, interaction data comprising the buttons that were interacted with and the timestamps of each interaction are sent from interaction device 704, via receiver 706, to content server 702 as detailed in the descriptions of FIGS. 1 and 2.

In an embodiment, once the interaction data is received by content server 702, content server 702 may determine a button rhythm from the interaction data and timestamps as detailed in FIG. 3. According to an embodiment, content server 702 may then compare the button rhythm to a stored list of modifying interactions and may further modify the content streamed to interaction device 704 according to the comparison, as detailed in FIG. 3.

For example, content server 702 may stream, over the internet, a television show starring a specific actor to interaction device 704, a smartphone. The content streamed to interaction device 704 may further comprise a button rhythm prompt, that, when followed, will stream a different television show starring the same actor. The user may then interact with buttons 710 according to the button prompt. Interaction device 704 may then send data comprising the button interactions with buttons 710 to content server 702. Content server 702 may then compare the data comprising the buttons interactions to a stored list of modifying interactions and change the stream to a different television show starring the same actor.

Figure 7B:
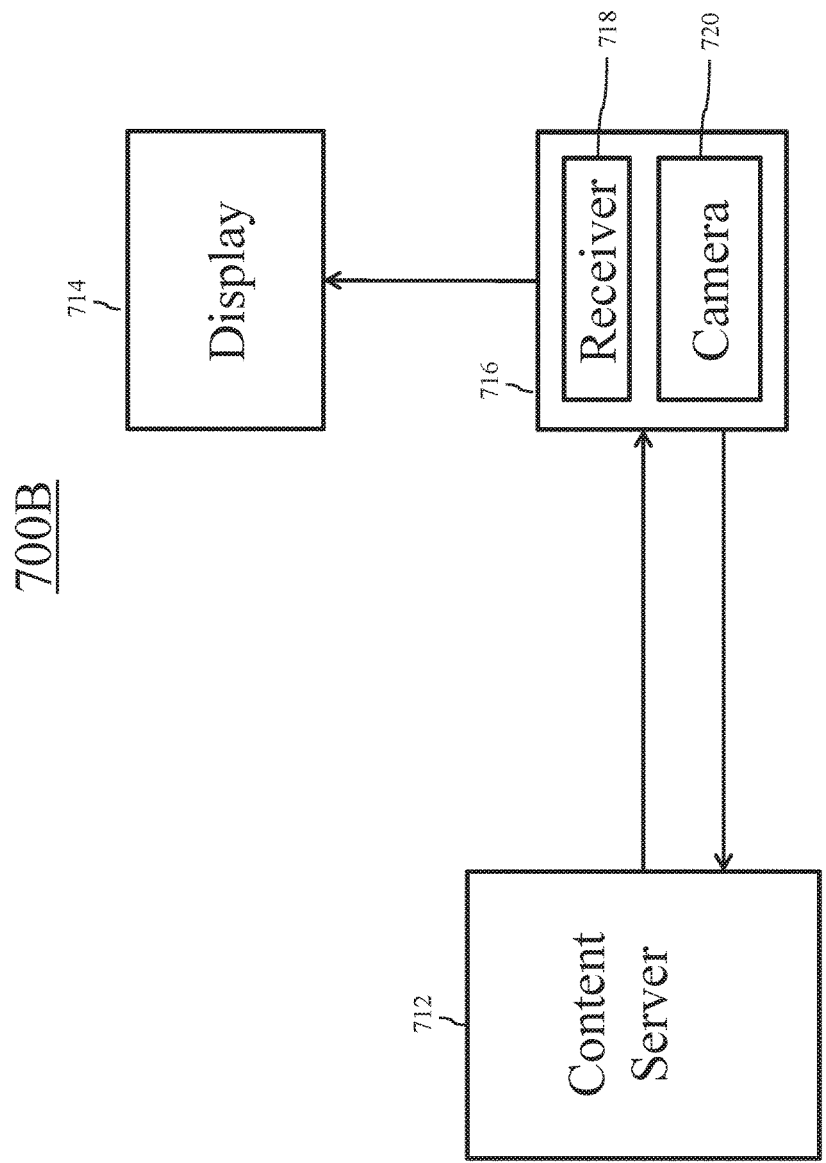
FIG. 7B is an exemplary case study of an interaction recognition of a television content interaction device, according to an embodiment.

FIG. 7B is an exemplary case study of an interaction recognition of a television content interaction device, according to an embodiment.

According to an embodiment, content server 712 may comprise a content server such as, for example, content server 102, and may stream content to interaction device 716 over the internet. The content streamed to interaction device 716 may comprise a video, a television show, a movie, an advertisement, a song, a live stream, an audio file, or any combination thereof—to name a few examples. In an embodiment, interaction device 716 may comprise a gaming console comprising receiver 718 and camera 720. According to an embodiment, interaction device 716 may displayed the streamed content on display 714.

In an embodiment, receiver 716 may comprise, for example, receiver 118 and display 714 may comprise, for example, display 124. According to an embodiment, camera 720 may comprise a forward-facing camera, a rear-facing camera, digital camera, infrared camera, CMOS camera, CCD camera, wireless camera, or any combination thereof—to name a few examples.

According to an embodiment, camera 720 may capture an image while content is being streamed from content server 712. Camera 720 may further, through background subtraction, Gaussian subtraction, frame differencing, mean filter, or any combination thereof, detect an object within the image captured, such as, for example, the face of a user. In an embodiment, interaction device 716 may send the captured image with a detected object to content server 712. Content Server 712, using background filtering, facial recognition software, a facial recognition engine, principal component analysis, linear discriminate analysis, elastic bunch graph matching, or any combination thereof, may determine a facial expression from the captured image.

In an embodiment, content server 712 may compare the determined facial expression to a stored list of modifying interactions and may further modify the content streamed to interaction device 716 according to the comparison, as detailed in FIG. 3.

For example, content server 712 may stream, over the internet, a movie with a Motion Picture Association of America (MPAA) R rating to interaction device 716, a gaming console. While the content is being streamed, camera 720 of interaction device 716 may capture an image which comprises a user making a facial expression indicating displeasure. Interaction device 716 may then send the captured image to content server 712, and content server 712 may determine, from the captured image, that a user is making a facial expression of displeasure. Content server 712 may then compare the determined facial expression to a stored list of modifying interactions and change the stream to a different movie with a lower MPAA rating.

Figure 8:
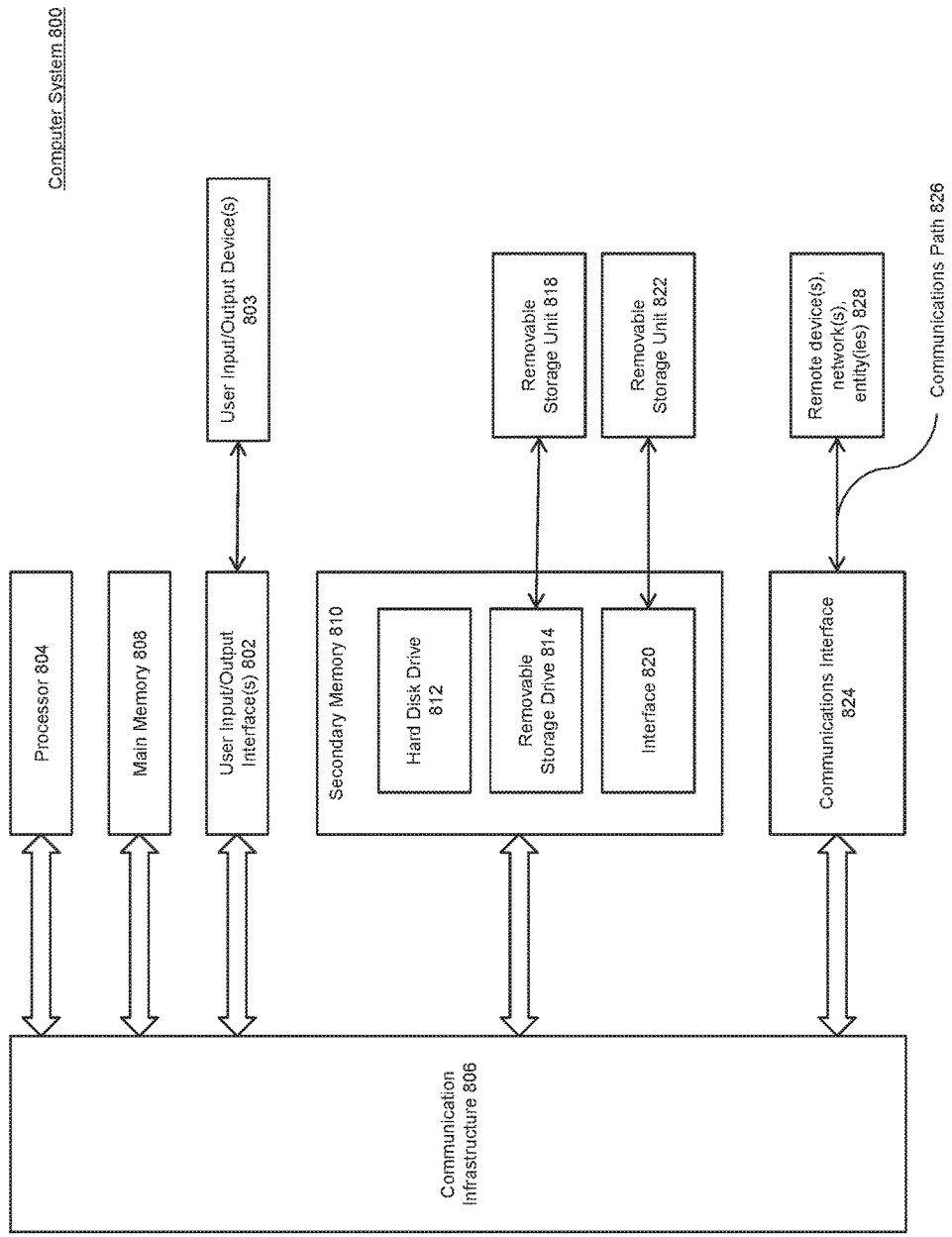
FIG. 8 is an example computer system useful for implementing various embodiments.

Various embodiments can be implemented, for example, using one or more well-known computer systems, such as computer system 800 shown in FIG. 8. For example, computer system 800 can compare received interaction data to a stored list of modifying interactions. Computer system 800 can further modify content that is broadcast based on received interaction data. Computer system 800 can be any computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 608 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
receiving, by at least one processor; a set of interaction data comprising selections of a plurality of different buttons within a specified time period, from a receiver configured to receive the interaction data;
comparing the received interaction data against stored interaction data, wherein the set of interaction data corresponds to a modification of content corresponding to the received interaction data;

selecting the content modification based on the comparison; and modifying, by at least one processor, content streamed to the receiver according to the selected content modification.

2. The method of claim 1, wherein the selecting comprises:

comparing, by at least one processor, ambient noise received by a microphone to a plurality of songs; and determining, by at least one processor, a song from the plurality of songs based upon the comparison of ambient noise received by the microphone to the plurality of songs.

3. The method of claim 1, wherein the selecting is based on an image received by a camera.

4. The method of claim 1, wherein the set of interaction data comprises the plurality of button selections and a plurality of respective timestamps.

5. The method of claim 4, wherein the determining, by at least one processor, an interaction from the interaction data further comprises:

determining, by at least one processor, a rhythm between a first selection of a first one of the buttons at a first timestamp, and a second selection of a second one of the buttons at a second timestamp.

6. The method of claim 5, further comprising:

transmitting a prompt for the determined rhythm.

7. The method of claim 1, further comprising:

receiving, by at least one processor, a query for stored interactions; and returning, by at least one processor, a stored interaction according to the query.

8. The method of claim 1, wherein the modifying comprises:

identifying a feature of the content streamed to the receiver;

determining one or more other pieces of content corresponding to that feature; and providing the one or more other pieces of content to the receiver.

9. A system, comprising:

a memory;

and at least one processor coupled to the memory and configured to:

receive a set of interaction data comprising selections of a plurality of different buttons within a specified time period, from a receiver configured to receive the interaction data from a plurality of sensors;

compare the received interaction data against stored interaction data, wherein the set of interaction data corresponds to a modification of content corresponding to the received interaction data;

select the content modification based on the comparison; and modify content streamed to the receiver according to the selected content modification.

10. The system of claim 9, the at least one processor configured to select is further configured to:

compare ambient noise received by a microphone to a plurality of songs; and determine a song from the plurality of songs based upon the comparison of ambient noise received by the microphone to the plurality of songs.

11. The system of claim 9, wherein the set of interaction data comprises the plurality of button selections and a plurality of respective timestamps.

12. The system of claim 11, wherein the at least one processor configured to determine is further configured to:

determine a rhythm a rhythm between a first selection of a first one of the buttons at a first timestamp, and a second selection of a second one of the buttons at a second timestamp.

13. The system on claim 9, wherein the at least one processor configured to:

receive a query for stored interactions; and return a stored interaction according to the query.

14. A tangible, non-transitory computer-readable device having instructions stored thereon that, when executed by at least one computing device, causes the at least one computing device to perform operations comprising:

receiving a set of interaction data comprising selections of a plurality of different buttons within a specified time period, from a receiver configured to receive the interaction data;

comparing the received interaction data against stored interaction data, wherein the set of interaction data corresponds to a modification of content corresponding to the received interaction data;

selecting the content modification based on the comparison; and modifying content streamed to the receiver according to the selected content modification.

15. The non-transitory computer-readable device of claim 14, the operations further comprising:

comparing ambient noise received by a microphone to a plurality of songs; and determining a song from the plurality of songs based upon the comparison of ambient noise received by the microphone to the plurality of songs.

16. The non-transitory computer-readable device of claim 14, wherein the selecting is based on an image received by a camera.

17. The non-transitory computer-readable device of claim 14, wherein the interaction data comprises the plurality of button selections and a plurality of respective timestamps.

18. The non-transitory computer-readable device of claim 17, the operations further comprising:

determining a rhythm between a first selection of a first one of the buttons at a first timestamp, and a second selection of a second one of the buttons at a second timestamp.

19. The non-transitory computer-readable device of claim 14, the operations further comprising:

receiving a query for stored interactions; and returning a stored interaction according to the query.

* * * * *